Figure 1:
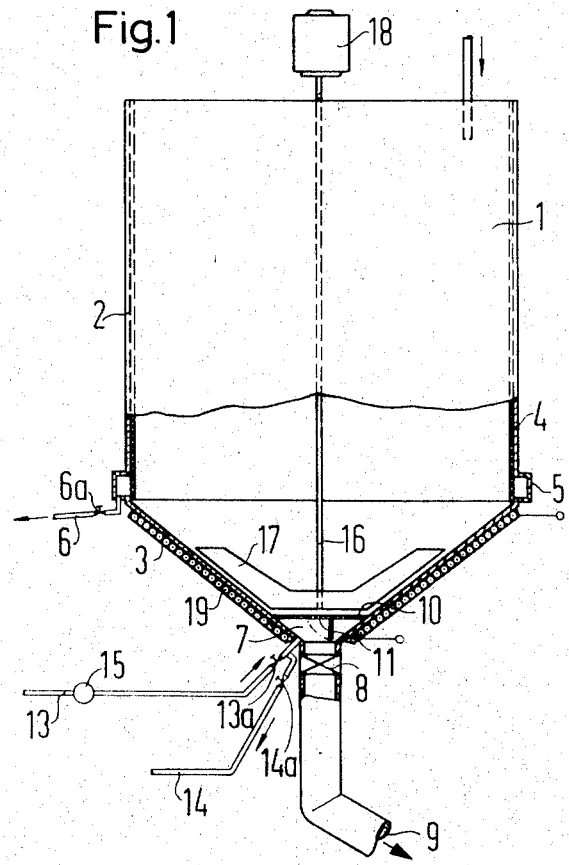

United States Patent [19]
Soldan

[11] 3,782,551
[45] Jan. 1, 1974

[54] LAUTER TUB AND METHOD

[76] Inventor: Gerd Soldan, 8121 Aidling, Habach, Germany

[22] Filed: Dec. 17, 1970

[21] Appl. No.: 99,116

[30] Foreign Application Priority Data
Dec. 23, 1969 Germany.................. P 19 64 416.7

[52] U.S. Cl........................ 210/179, 99/52, 99/278
[51] Int. Cl............................................ B01d 39/12
[58] Field of Search.................. 210/72, 73, 83, 71, 210/178, 179, 313, 314, 318, 319; 99/52, 278; 195/103, 135

[56] References Cited
UNITED STATES PATENTS
| | | | |
|---|---|---|---|
| 2,768,897 | 10/1956 | Paine | 99/52 |
| 2,936,236 | 5/1960 | Schwaiger et al | 99/52 |
| 919,797 | 4/1909 | Waid | 210/318 |
| 2,218,366 | 10/1940 | Taylor | 210/318 X |
| 1,330,463 | 2/1920 | Giesecke | 210/319 X |

FOREIGN PATENTS OR APPLICATIONS
| | | | |
|---|---|---|---|
| 197,891 | 4/1908 | Germany | 210/83 |
| 819,238 | 11/1951 | Germany | 210/83 |

*Primary Examiner*—John Adee
*Attorney*—Delio & Montgomery

[57] ABSTRACT

The mash in the brewing of beer is purified to provide desired concentrations of wort by filtering the mash in a vessel provided with a filtering sleeve vertically and fixedly mounted at an intermediate section of the vessel, a first outlet below the sleeve for first wort, at least one additional outlet below the first outlet to remove second wort, an outlet for draff sediments at the lower terminus of a conical lower section of the tub, the lower section being open to the upper intermediate section, an agitator within the conical lower section, and a second filtering element at the outlet for draff sediments.

7 Claims, 2 Drawing Figures

PATENTED JAN 1 1974

3,782,551

INVENTOR
Gerd Soldan
BY
Dedio and Montgomery
ATTORNEYS

LAUTER TUB AND METHOD

BACKGROUND OF THE INVENTION

This invention relates to a filtering vessel, such as a lauter tub used for filtering in connection with the brewing of beer. The device includes a container with a filter to separate the wort from the mash and with at least two outlets, including at least one for the wort and another for the draff sediment.

In brewing one is anxious to produce a wort of a certain concentration, beginning with a distinct quantity of bruised malt and an adequate quantity of water. The bruised malt is first extracted during the mashing to give the so-called first wort. The first wort is decanted from the mash and then has to be treated further.

The separation of the wort from the draff, or purifying of the mash, is done usually in a lauter tub into which the mash is transferred from the mash tub after the mashing procedure; or the lauter tube is used as the mash tub at the same time. As a rule the lauter tubs are containers with cylindrical side walls and a plane bottom. A filter with round or slit perforation is fixed just above the bottom. The bottom of the tub has outlets to drain off the first wort which passed the filter.

During the draining off of the first wort, the draff particles which are deposited on the sieve, form a natural filter. This filter becomes more and more dense and it is possible that the draining off is interrupted even before all of the first wort has flowed off. To prevent a poor output of first wort, it has been attempted to counteract the condensing of the natural filter, formed by the draff, by using a coarser granulation of the malt. This resulted in a more permeable filter, but because of the coarser granulation a smaller output of extract resulted.

It has also been attempted to slow down the flow of the wort to prevent the suction of the running liquid from contracting the filter. But as a result the process of purifying is highly retarded so that special precautions are necessary to stabilize the temperature of the mash.

OBJECTS AND SUMMARY

Accordingly, one object of the invention is to provide a vessel for filtering or purifying mash by which desired concentrations of wort can be obtained.

Another object is to provide a vessel for filtering or purifying mash in which wort can be removed in separate streams.

A still further object is to provide a vessel for the filtering of mash in which plugging of the annular filter element normally employed therein is avoided or minimized.

Still other objects and advantages of the invention will in part be obvious and will in part be apparent from the specification.

The device described of this invention overcomes the disadvantages of the purifying techniques mentioned above by utilizing a lauter tub having a filter within and around the whole of the cylindrical side wall of the tub. This filter is fixed near to the wall and covers at least part of the height of the tub.

Figure 2:
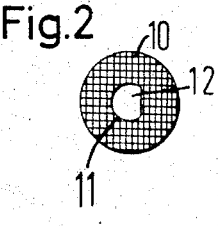

For a fuller understanding of the invention, reference is had to the following description taken in connection with the accompanying drawing, in which:

FIG. 1 is a partially sectional side elevation of a filtering vessel of the invention; and FIG. 2 is an enlarged top plan view of a filtering element employed in a filtering vessel of the invention.

With reference to FIGS. 1 and 2, a lauter tub of the invention comprises a cylindrical section 2 and a tapered bottom section 3. Near the side walls 2 (preferably about 5 to 6 mm.) a filter element 4 is attached. Preferably this filter covers the cylindrical section 2 completely in height as well as in circumference, but it may also be adjacent only an intermediate portion of the tub.

Near the lower edge of the filter 4 is mounted a header 5 surrounding the cylindrical section 2. Header 5 ends in a tubing 6 with a valve 6a. Tubing 6 provides an outlet for the first wort, which has permeated the filter element 4, to a wort kettle (not shown). The bottom section 3 has at its lower end an outlet 7 which leads to a tubing 9 provided with a stop-cock 8. Outlet 7 is covered with a ring-shaped filter 10 above the stop-cock 8. The central opening 11 of the ring-shaped filter 10 is sealed by a lid 12 which can be released from below. The lid 12 is shown hingeably mounted but it could also be slidable or rotatable to one side. Between the stop-cock 8 and the ring-shaped filter 10, two tubings 13 and 14 lead to the outlet 7 in the bottom of the tub. The water for refilling of the tub 1 is pumped by a pump 15 through the ring-shaped filter 10 along the tubing 13 into the tub. By means of the tubing 14, the final wort which passes from the tub 1 through the ring-shaped filter 10 after the decanting of the first wort, can be removed. Valves 13a and 14a are mounted on tubings 13 and 14, respectively, for control of flow therethrough.

An agitator 16 provides for mixing of the water admitted as refill and the draff sediments, or for the mixing of the mash during the mashing. A propeller 17 fits to the bottom part 3 and is actuated by a motor 18 outside the tub. A heating device 19 is mounted to the bottom part 3.

If the lauter tub 1 is used to mash as well as to filter, the mash is put into the container while the agitator 16 is running. The valves 6a, 13a and 14a, the stop-cock 8, and the lid 12 are sealed off. The container is heated up to appropriate temperatures and kept there for suitable times. If the occasion arises, one can do without the heating up to the mash temperature.

After the mashing is finished, the valve 6a is opened and the first wort is drained off along the tubing 6 to the wort kettle. After this is done, water is admitted through the tubing 13 to the mash in bottom section 3. The agitator 16 mixes the water and the mash. Then the final mash is decanted through tubing 14. The last run of wort together with the draff sediments is then removed from the tub 1 along the tubing 9 after the lid 12 and the stop-cock 8 are opened.

Preferably, the first wort outlet 6a, which has permeated filter 4, is positioned in the side wall of the tub, near the lower end of filter 4. Preferably also the outlet is a tube completely surrounding the tub. Thereby the first wort can be drained off easily and quickly into a wort kettle.

It is advantageous to mold the bottom of the container in a conical shape. In doing so, the partial screening of the filter by the gradually depositing draff sediments is avoided so that the efficiency of the filter is not diminished. The outlet for the draff sediments is positioned preferably to the conically shaped bottom of the container for communication with tubing 9.

A tubing 9 with a stop-cock 8 is recommended for connection to the outlet for the draff sediment. The outlet is covered by a ring-shaped filtering element or sieve 10 above the stop-cock 8 and the central opening of the filtering element can be sealed by a removable lid 12. This arrangement allows continuation of the purifying process after the drain of the first wort. Thus, the final wort can be obtained before the draff sediment is removed from the tub.

As indicated above, it is possible to admit water of suitable temperature through the mash in the lower part of the tub. This is achieved by tubing 13 mounted between the ring-shaped sieve 10 and the stop-cock 8 in the line for the draff outlet. Second tubing 14 then provides for withdrawal of the final wort. Alternatively, the required quantity of water can be poured into the tub from above. In this instance, the final wort permeates the ring-shaped sieve 10 and is passed to a wort kettle through the second tubing 14. Near the end of the purifying process, the tapered bottom of the tub is emptied by opening lid 12 and stop-cock 8. The aqueous draff is then freed from the water, conveniently by means of a perforated tube, and the draff sediments are pumped into a draff container.

During the purifying of the final wort, cooling of the draff layer should be avoided. For this purpose a device 19 for heating may be attached to the bottom section 3. This device can be operated by gas, hot water, vapour or some other fuel.

To achieve a homogeneous mixture of the final mash and the refilling, an agitator 16 in the tub is of advantage to rotate preferably near to tapered bottom. Such an arrangement permits use of the lauter tub as a mash tub when desired. The mash can be poured into the tub while the agitator is running. At the same time the tub may be heated to the temperatures appropriate for the mashing. During this process the favorable temperatures are kept constant for suitable time intervals. When the mashing is finished, the purifying can be done by passing the first wort through the filter and the header into the wort kettle as described above. Consequently, it is not necessary to remove the mash to another container.

While considerable variation in mesh sizes are possible, a filter 4 of at least 1,000 openings per $cm^2$, and more preferably of 5,000 openings per $cm^2$, are advisable. Filter gauze of similar characteristics can be used for ring-shaped filter 10.

One advantage of the lauter tub of the invention is avoidance of deposit of draff particles on the filter to form a gradually contracting layer which the first wort must permeate before flowing off into the wort kettle. As a result of the invention the drain of wort from the tub is considerably accelerated and maintained essentially constant.

Moreover, the lauter tub of the invention allows malt granulations which are no longer determined by the purifying process. Now finely ground raw materials can be used, resulting in a larger yield of extract. The invention now makes possible the use of mash malt consisting of up to about 95 percent powder. It is even possible to grind the awn for a second time after filtering to increase the amount of extract derived from the bruised malt.

In the past the dimensions of the lauter tub were determined by the thickness of the draff layer depositing on the sieve during the purifying process. Now containers can be built smaller in diameter and larger in height so as to be adaptable to larger fillings. If necessary, the height of the container can be varied easily by putting additional wall and filter elements on top of the container.

Moreover, the lauter tub of the invention is more easily accessible so that the time of emptying and cleaning is reduced.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A lauter tub for use in purifying brewing mash, consisting essentially of:
    first, vertically extending side walls,
    tapering extensions of said first walls below said first walls forming a conical lower section of said tub,
    a first outlet for wort positioned in said first walls where said tapering extensions join said first walls,
    second, vertically extending side walls fixedly mounted within and parallel to said first walls and defining a space therebetween, the lower ends of said second walls joining said first walls where said tapering extensions join said first walls,
    a first filter element defined by at least an intermediate section of said second walls,
    an outlet for draff sediments positioned at the lower terminus of said conical lower section, said outlet being provided with a second filter element,
    a first tubing for water supply and a second tubing for removal of wort, and
    agitation means providing agitation within said conical lower section;
    wherein the interior space defined by said second walls and said conical lower section is continuous, whereby buildup of sediment on said first filter element is prevented.

2. A lauter tub according to claim 1 wherein said second filter element has an opening therethrough, said opening being provided with a movable lid.

3. A lauter tub according to claim 1 wherein said outlet for draff sediment is provided with tubing having a stopcock, and wherein said first and second tubings are attached to said outlet for draff sediment between said second filter element and said stopcock.

4. A lauter tub according to claim 1 including heating means mounted on said tapered bottom.

5. A lauter tub according to claim 1 wherein said first filter element has at least 1,000 openings per $cm^2$.

6. A lauter tub according to claim 1 wherein said second filter element has at least 1,000 openings per $cm^2$.

7. A lauter tub according to claim 1 wherein said first outlet for wort comprises a conduit surrounding said tub.

* * * * *